Feb. 5, 1946.    F. N. ROTH    2,394,207
TRAILER HITCH
Filed Dec. 29, 1944
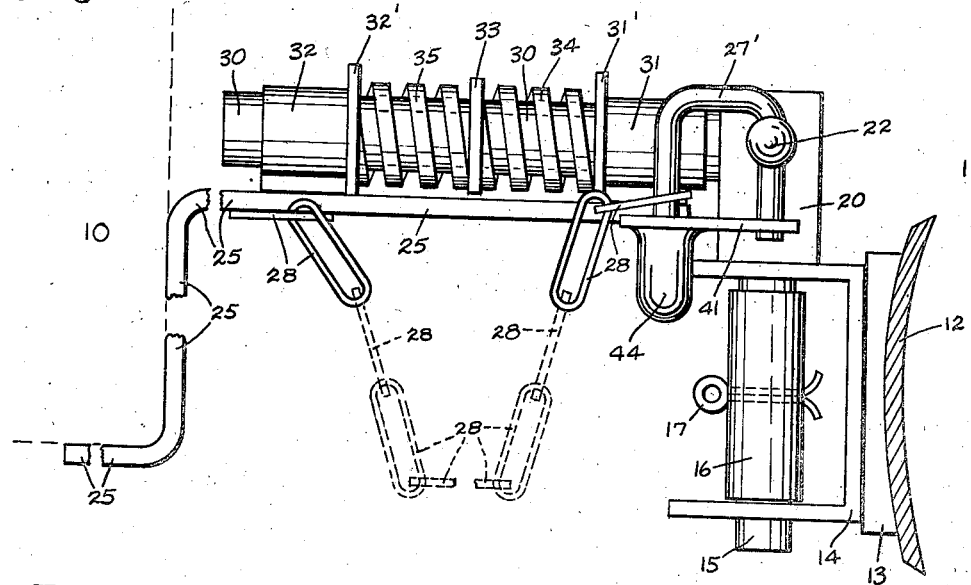
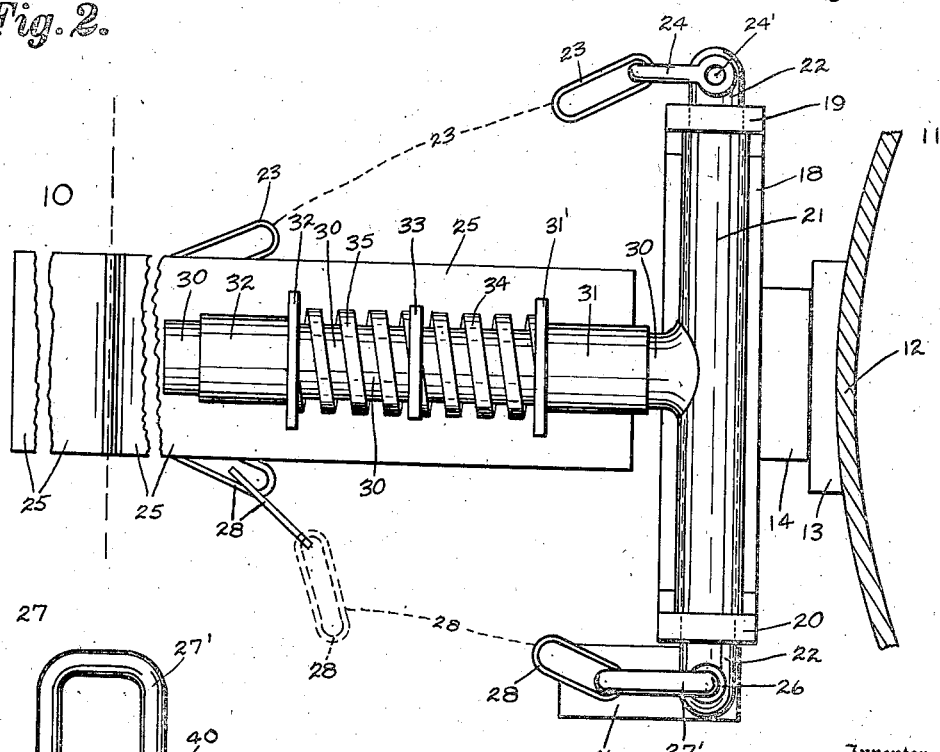
Inventor
Fremont N. Roth
Arthur H. Sturges
By
Attorney Patented Feb. 5, 1946

2,394,207

UNITED STATES PATENT OFFICE 2,394,207

TRAILER HITCH

Fremont N. Roth, Twin Falls, Idaho

Application December 29, 1944, Serial No. 570,332

3 Claims. (Cl. 280—33.9)

This invention relates to highway vehicles and more particularly to towing couplers for pivotally connecting an automobile to a trailer.

The primary object of the present invention is to provide a new trailer hitch so constructed and the parts thereof so cooperatively arranged that the shock caused by sudden acceleration and stopping is cushioned for eliminating strain on the trailer and jerking motions applied to occupants without interfering with a freedom of horizontal and vertical motions of the one vehicle with respect to the other, said hitch being also adapted to support the front end of a four-wheeled trailer.

A further object of the invention is to provide a trailer hitch having guard-chains for preventing a loss of a coupling-pin and clasp employed.

Other and further objects and advantages of the invention will be apparent from the following detailed description thereof.

In the drawing:

Figure 1 is a side view of the new trailer hitch, certain portions thereof being broken away and others being represented partially by means of dotted lines.

Figure 2 is a top plan view of the hitch and parts shown in Figure 1.

Figure 3 is a detailed view of a clasp employed, certain portions thereof showing in section.

Most trailer hitches now in use permit an abrupt and violent jarring of the trailer and the automobile pulling the said trailer at times when it becomes necessary to suddenly start or stop. This impact causes a severe strain on the automobile bumper and its connections as well as other parts of the automobile and trailer frames. The frequent repetitions of these shocks often strip the threads of bolts securing the automobile bumper to the automobile frame, often weakening a bumper beyond further use for the strenuous purpose of trailer hauling.

Sudden uncushioned jolts render an automobile much more difficult to control and greatly increase the dangers of loose gravel roads, icy streets and poor visibility. In addition, the nervous taxation caused thereby is very fatiguing and considerably lessens the rapidity of a driver's mental decisions and muscular reactions.

A trailer and an automobile, not shown, are generally indicated at 10 and 11 respectively. The rear horizontally disposed bumper bar of the automobile is indicated at 12. As is well known, said bumper bars are usually of arcuate contour and in longitudinal plan and also have curved characteristics in cross section. The bar 12 is attached to the hitch by means of a filler block 13, shaped to conform to the curvature in said automobile bumper. The block 13 is secured to the bar 12 by any suitable means such as bolts or welding, not shown.

A supporting member 14 is welded to the block 13. In instances where the bumper bar 12 has a flat rear vertically disposed surface, the block 13 is not employed. The member 14 is substantially C-shaped in side elevation, as shown in Figure 1. The upper and lower arms of the member 14 have aligned apertures which receive the rotatable shaft or king-pin 15 of the new device. A sleeve 16 of annular cross section receives the king-pin 15 in its bore and the ends of the sleeve bear against the flanges or arms of the supporting member 15. A cotter-pin or coupler 17 is thrust through aligned apertures of the members 15 and 16 for holding them together in a manner whereby they may be readily detached at desired times by removing the cotter-pin 17 and since, during use, there is approximately no strain applied to the cotter-pin, a medium sized cotter-pin is ample for said purpose.

The sleeve 16 and pin 17 prevent a disengagement of the king-pin 15 and its supporting member 14 during use and permit horizontal turning movements of the automobile with respect to the trailer. The arms of the member 14 are spaced apart in appreciable distance whereby they provide a long bearing for the rotatable king-pin 15.

The medial portion of an elongated bar 18 is welded to the upper end of the king-pin 15 and, in use, the member 18 rests upon the upper arm of the member 14. The bar 18 is provided with upstanding ears 19 and 20 at its respective ends. The ears are provided with apertures and receive a coupling-pin 22. The pin 22 also extends through the tubular head 21 of the T-shaped shaft 30 of the shock absorbing mechanism.

An end link of a chain 23 is attached to a clevis 24. The clevis has a coupler-pin 24' and the latter extends through an adjacent end of the coupling-pin 22, as shown in Figure 2. The other end of the chain 23 is welded to the towing-tongue 25, whereby at times when the pin 22 is removed, it does not become lost with respect to the device as a whole. The rear end of the tongue 25 may be shaped in side elevation as shown and attached to the trailer by bolts or the like, not shown.

The clasp of the device is generally indicated at 27 in Figure 3 and includes a platform 41 having two apertures for respectively receiving therethrough, during use, the legs of a C-shaped hasp or coupler 27'.

In use, the shorter leg of the hasp 27' is disposed through the aperture 26 at one end of the coupling-pin 22 for preventing sliding movements and a detachment of the pin 22 from the tubular head 21.

The clasp 27, in use, is attached to a chain 28 and the rear end of the chain 28 is welded to the trailer-tongue 25, as shown in Figure 1. The forward end of the shock absorber shaft 30 is disposed at a right angle to the tubular head 21 and said parts are rigidly welded together. The shaft 30 is slidably disposed through bearing-blocks 31 and 32 which are welded securely to the towing-tongue 25 of the trailer.

A detent collar 33 is disposed around the shaft 30 and is welded thereto. A collar is preferably employed for providing an even abutment for the adjacent ends of compressible steel springs 34 and 35 during sliding movements of the shaft 30 since said springs are disposed between the flanges 31' and 32' of the bearing-blocks 31 and 32 respectively and at opposite sides of the collar 33.

It will be seen that there is side-wise rotation permitted since the shaft 15 is rotatable in its bearings for permitting turning movements of the automobile with respect to the trailer; that vertical swinging movements of the trailer with respect to the automobile are permitted since the sleeve or tubular head 21 may turn on the coupling-pin 22 for accommodating travel upon bumpy roads and the like and that an absorption of shock and jars is attained incident to stopping and starting and resultant from application of brakes since the spring 34 cushions shocks applied in one direction and the spring 35 absorbs shocks and jerks applied in an opposite direction. At times when it is desired to uncouple the trailer, the arm 27' of the clasp 27 is lifted from its aperture 40 of the platform 41 and against the urge of the spring 43, whereupon the arm 27' is moved sidewise of the platform 41 until the arm 27' can be freed from the coupling-pin 22 for removal of the latter from the tubular member 21. While driving, however, the arm 27' of the clasp is securely held in place by the spring 43, as shown in Figure 3, which bears against and between the platform 41 at its upper end and against an abutment 42, the latter being welded to the lower end of the longer leg of the hasp 27'.

To prevent the spring 43 from becoming rusted or the like, a protecting cup or guard 44 is provided. The cup is disposed about the spring 43, having its rim welded to the platform 41 on the under side of the latter.

A pivotal motion in both the vertical and horizontal planes is provided and is an important part of the invention. A pivoting of the hitch is necessary for turning corners and for parking; while a rotation in the vertical plane is indispensable for accomplishing the bending of the automobile-trailer caravan at the points of connection of the said automobile and trailer without straining that connection on a roadway having an uneven surface.

Further advantages of this invention are the incorporation of safety-chains, as shown at 23 and 28, which preclude loss of the removable parts and the possibility of dangerous accidents arising from a substitution of common bolts or the like for the steel pins of the new device.

It will also be seen that a convenient means is provided to couple and uncouple the automobile from the trailer by merely releasing the arm 27' of the hasp which thereby frees the coupling-pin 22 and permits the latter to be withdrawn from the ears 19 and 20 of the elongated bar 18.

It will be obvious that my invention is susceptible of some change and modification without departing from the principles and spirit thereof and for this reason I do not wish to be understood as limiting myself to the precise arrangement and formation of the several parts herein shown in carrying out my invention in practice, except as claimed.

I claim:

1. A trailer hitch comprising a mounting adapted to be attached to a horizontally disposed automobile bumper; a king-pin pivotally disposed through said mounting at substantially a right angle to said bumper; a bar having vertically disposed ears secured to the upper end of said pin, said ears being provided with apertures; a coupling-pin disposed through said apertures, a tubular member having a shaft attached at substantially a right angle thereto; said member being disposed around said coupling-pin; a towing-tongue for said trailer; spaced apart bearing blocks on said tongue; said shaft being slidably disposed through said bearing blocks and having a collar secured thereto, said collar being between said blocks; springs disposed about said shaft between said collar and said blocks; means for preventing an accidental detachment of said coupling-pin with respect to said tubular head, and means for preventing a detachment of said king-pin with respect to said mounting.

2. The construction described in claim 1 in which the preventing means includes a clasp releasably secured to one end of the coupling-pin thereof and a clevis at the other end of said coupling-pin.

3. A trailer hitch comprising a mounting adapted to be attached to a horizontally disposed automobile bumper, said mounting having horizontally disposed spaced-apart arms; a king-pin pivotally disposed through said arms and having an elongated bar secured to one end thereof; a sleeve disposed about said king-pin between said arms; means for securing said king-pin and sleeve together; a shaft; a pivotal connection between said shaft and said king-pin; a towing-tongue for the trailer; spaced-apart bearing-blocks on the tongue, said shaft being slidably disposed with respect to said blocks; a collar on said shaft between said blocks; and resilient means on said shaft between said blocks arranged to cooperate with said blocks and collar for absorbing shocks applied to said shaft in two directions.

FREMONT N. ROTH.